No. 740,327. PATENTED SEPT. 29, 1903.
C. E. STALLCOP.
MOUNTING FOR RIFLE TELESCOPES.
APPLICATION FILED FEB. 6, 1902.
NO MODEL.
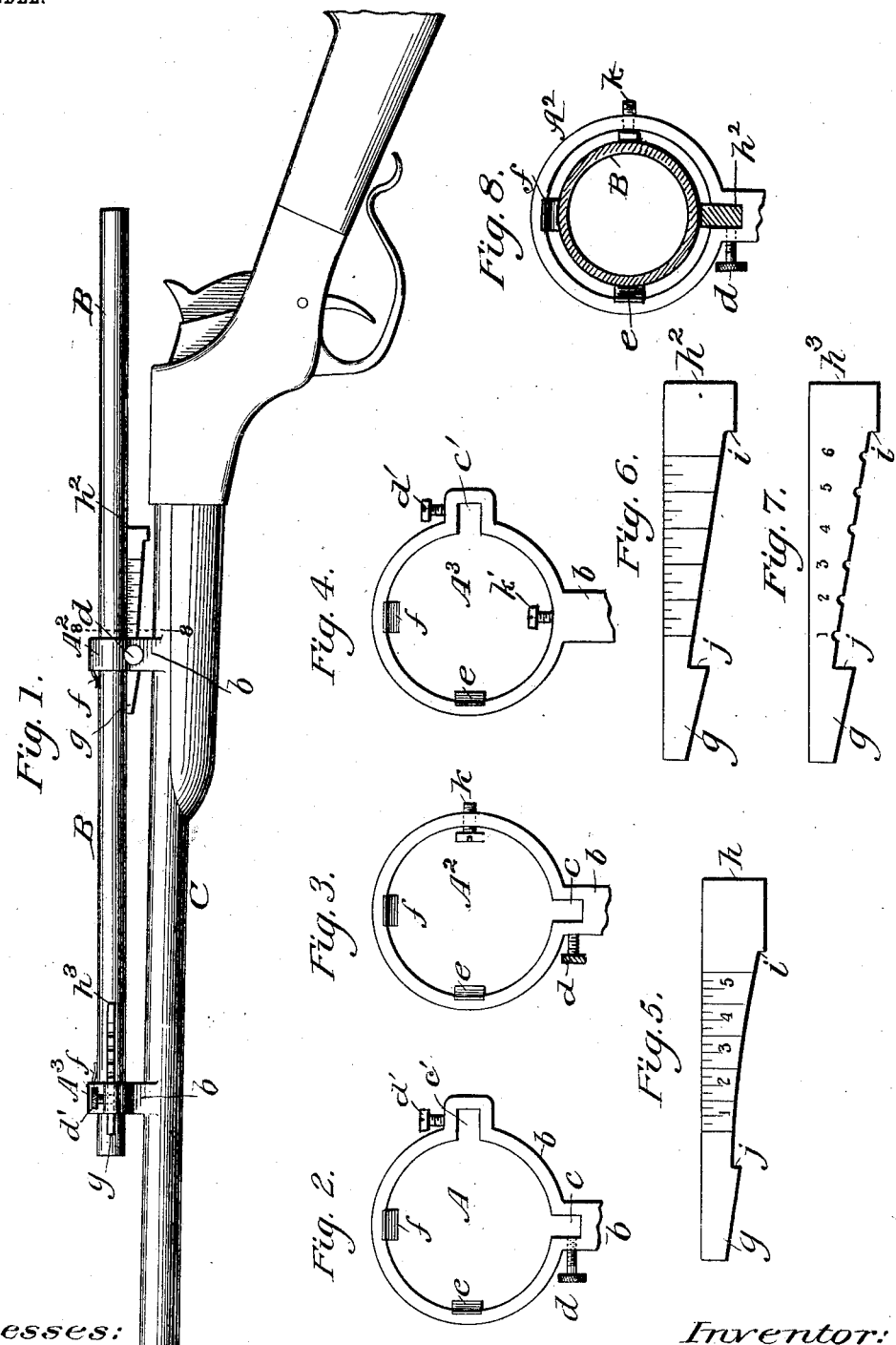
Witnesses:
Jos. A. Ryan
Amos W. Hart
Inventor:
Charles E. Stallcop.
By Munn & Co.
Attorneys No. 740,327. Patented September 29, 1903.

UNITED STATES PATENT OFFICE.

CHARLES EDWIN STALLCOP, OF SAC CITY, IOWA.

MOUNTING FOR RIFLE-TELESCOPES.

SPECIFICATION forming part of Letters Patent No. 740,327, dated September 29, 1903.

Application filed February 6, 1902. Serial No. 92,944. (No model.)

*To all whom it may concern:*

Be it known that I, CHARLES EDWIN STALLCOP, a citizen of the United States, residing at Sac City, in the county of Sac and State of Iowa, have invented certain new and useful Improvements in Telescopic Mountings for Rifles, of which the following is a specification.

My invention relates to improvements in mountings for telescopes applied to rifles, and particularly in mountings of that class which permit vertical or lateral adjustment of the telescope, or both, as conditions may require.

In my invention the mountings proper or holders for the telescope are provided with springs which bear upon the telescope to press it both downward and laterally, and I employ in connection with such mountings a graduated slide which is practically wedge-shaped and provided on its inclined edge with an elongated open slot or notch whose shoulders are adapted to engage the mountings, as hereinafter described. By adjusting the slide longitudinally in the mountings the telescope may be lifted or pressed laterally and held in the position to which it is adjusted.

The details of construction, arrangement, and operation of parts are as hereinafter described, reference being had to the accompanying drawings, in which—

Figure 1 is a side view of a small rifle to which my invention is shown applied. Figs. 2, 3, and 4 are face views of different forms of mountings. Figs. 5, 6, and 7 are face views of different forms of the wedge-shaped slide. Fig. 8 is a cross-section on the line 8 8 of Fig. 1.

As shown in Fig. 1, a telescope B is held in mountings $A^2$ and $A^3$, applied to a rifle-barrel C. As shown in said figure, a spring $f$ projects from each of the mountings $A^2$ and $A^3$ and bears downward upon the telescope B, and wedge-shaped slides $h^2$ and $h^3$ are applied as required for adjusting the telescope vertically and laterally, respectively.

I will now describe the details of construction and arrangement of parts.

As shown in Figs. 2, 3, and 4, the several mountings A, $A^2$, and $A^3$ are practically rings or short tubes provided with shanks $b$, by which they are secured to the rifle-barrel C in any approved manner. Each of the forms shown is provided at the top with a plate-spring $f$ and at one side with a smaller spring $e$. It is apparent that these springs bear upon the telescope B in a downward direction and laterally, respectively. The form $A^2$ is shown in Fig. 1 as the rear mounting and the form $A^3$ as the front mounting for the telescope B. The form $A^2$ is provided with a notch $c$ in its lower side to receive a wedge-slide, as shown in Figs. 1 and 8. A lateral clamp-screw $d$ is applied to the right-hand side of the mounting $A^2$, and when duly adjusted the telescope B will be held securely between the several bearings provided by the springs $e$ and $f$, the screw $k$, and the wedge $h^2$. The form of mounting $A^3$ in which the front end of the telescope B is held differs from the form $A^2$ in that the notch or slot $c$ for the wedge-slide is arranged laterally or at one side, and a screw $k'$ is applied at the bottom of the mounting $A^3$ for the purpose of clamping the wedge-slide inserted at that point. In Fig. 1 the form $h^3$ of the wedge-slide there applied for lateral adjustment of the telescope B is that shown in Fig. 7. It will be seen by inspection of Figs. 5, 6, and 7 that each of the forms of wedge-slide shown is straight on one side edge and inclined on the other and also provided with an elongated slot or notch having square end shoulders $i j$. The portion of the slide included between $i$ and $j$ may be curved, as shown in Fig. 5, or straight, as shown in Fig. 6, or straight and notched, as shown in Fig. 7. In Figs. 5 and 6 the slide is shown graduated in the manner of an ordinary foot-rule, and in Fig. 7 the several notches formed in the cut-out or slotted portion are indicated by numerals which are equivalent to the graduations. When the wedge-slide is applied as shown in Fig. 1, the shoulders $i j$ limit its movement or adjustment longitudinally and prevent its accidental detachment from the mounting, while the graduations form an easy and simple indication of the exact degree to which the telescope B is adjusted. The clamp-screws $d$ and $d'$ serve merely to lock the wedge-slides in any position to which they may be desired. When the form $h^3$ (shown in Fig. 7) is employed, as indicated in Fig. 1, its notches will engage the clamp-screw $d'$. It will be apparent that pressure of the springs $e f$ is opposed to that exerted or applied to the wedge-shaped slides, and thus the telescope B is at all times held with due security.

Practically the slides are adapted to be interchanged, and they will be made of different sizes or lengths and with any preferred graduation to adapt them for use with different telescopic mountings.

Having thus described my invention, what I claim as new, and desire to secure by Letters Patent, is—

1. The combination, with a telescope and holders therefor, having guide-slots and springs arranged as described, of a wedge-shaped slide adapted for insertion and adjustment in the slots, and means for clamping it in any adjustment, substantially as shown and described.

2. The combination, with a telescope and mountings therefor having springs and slots substantially as described, of a wedge-shaped slide provided in its inclined side with an elongated notch having end shoulders adapted to engage the mounting as specified.

3. The combination, with a telescopic mounting, and a telescope held therein, of springs applied to said mountings, wedge-shaped slides arranged opposite the springs, and screws arranged for clamping the slides in any adjustment, substantially as shown and described.

In testimony whereof I have signed my name to this specification in the presence of two subscribing witnesses.

CHARLES EDWIN STALLCOP.

Witnesses:
CHARLES A. SMITH,
DANIEL E. SPAFFORD.